(12) United States Patent
Kawaguchi et al.

(10) Patent No.: US 10,357,903 B2
(45) Date of Patent: *Jul. 23, 2019

(54) ROLLER-TYPE PRESSURIZATION DEVICE, IMPRINTER, AND ROLLER-TYPE PRESSURIZATION METHOD

(71) Applicant: SCIVAX CORPORATION, Kanagawa (JP)

(72) Inventors: Hirosuke Kawaguchi, Tokyo (JP); Yutaka Taniguchi, Kanagawa (JP); Satoru Tanaka, Tokyo (JP)

(73) Assignee: SCIVAX CORPORATION, Kanagawa (JP)

( * ) Notice: Subject to any disclaimer, the term of this patent is extended or adjusted under 35 U.S.C. 154(b) by 432 days.

This patent is subject to a terminal disclaimer.

(21) Appl. No.: 14/402,402

(22) PCT Filed: Dec. 6, 2013

(86) PCT No.: PCT/JP2013/082888
§ 371 (c)(1),
(2) Date: Nov. 20, 2014

(87) PCT Pub. No.: WO2014/088107
PCT Pub. Date: Jun. 12, 2014

(65) Prior Publication Data
US 2015/0283754 A1    Oct. 8, 2015

(30) Foreign Application Priority Data

Dec. 6, 2012 (JP) .................................. 2012-267617

(51) Int. Cl.
*B29C 59/04* (2006.01)
*B29C 43/36* (2006.01)
(Continued)

(52) U.S. Cl.
CPC ........ *B29C 43/3697* (2013.01); *B29C 43/361* (2013.01); *B29C 59/02* (2013.01);
(Continued)

(58) Field of Classification Search
CPC ... B29C 43/46; B29C 2043/467; B29C 59/04; B29C 2791/006; B29C 2791/007
See application file for complete search history.

(56) References Cited

U.S. PATENT DOCUMENTS 3,461,704 A    8/1969 Rastelli
4,487,050 A   12/1984 Kajiwara
(Continued)

FOREIGN PATENT DOCUMENTS

EP    0 365 304 A2    4/1990
JP    58-55104         4/1983
(Continued)

OTHER PUBLICATIONS

Extended European Search Report for related European Application No. 13860085.3 dated Apr. 8, 2016, 8 pages.
(Continued)

*Primary Examiner* — Atul P. Khare
(74) *Attorney, Agent, or Firm* — Schroeder Intellectual Property Law Group, LLC

(57) ABSTRACT

A roller-type depressing device that can depress an object like a die or a molding target by controlling the pressure of a roller, an imprint device, and a method utilizing the same are provided. A roller-type depressing device depresses an object like a die or a molding target by a main roller, and includes a pressure adjusting plate, a roller moving unit that moves the main roller relative to the object, a pressure adjusting unit that holds the pressure adjusting plate so that force produced by a pressure difference in fluid applied to both faces of the pressure adjusting plate acts on the main
(Continued)

roller, a pressure receiving stage receiving pressure of the main roller, a pressure adjuster that adjusts the pressure difference in fluid applied to both faces of the pressure adjusting plate, and a pressure equalizer that equalizes pressure applied to the object by the main roller.

10 Claims, 5 Drawing Sheets

(51) Int. Cl.
  *B29C 59/02* (2006.01)
  *B29L 11/00* (2006.01)
  *B29L 7/00* (2006.01)

(52) U.S. Cl.
  CPC ............ *B29C 59/022* (2013.01); *B29C 59/04* (2013.01); *B29C 2043/3613* (2013.01); *B29C 2059/023* (2013.01); *B29L 2007/001* (2013.01)

(56) References Cited

U.S. PATENT DOCUMENTS

| | | | |
|---|---|---|---|
| 4,635,458 A | 1/1987 | Bradlee | |
| 4,800,742 A | 1/1989 | Feldmann | |
| 4,955,221 A | 9/1990 | Feldmann | |
| 4,984,009 A | 1/1991 | Makino et al. | |
| 5,355,707 A | 10/1994 | Inoue | |
| 6,829,050 B2 * | 12/2004 | Ikeda | B29C 59/046 |
| | | | 264/1.6 |
| 7,622,238 B2 * | 11/2009 | Uematsu | G03G 5/043 |
| | | | 430/130 |
| 8,210,015 B2 | 7/2012 | Kneppe | |
| 8,215,944 B2 | 7/2012 | Takaya | |
| 9,808,985 B2 | 11/2017 | Kawaguchi et al. | |
| 2002/0098257 A1 | 7/2002 | Ikeda et al. | |
| 2003/0030188 A1 * | 2/2003 | Spengler | B29C 37/0032 |
| | | | 264/458 |
| 2007/0163321 A1 | 7/2007 | Brown | |
| 2009/0174118 A1 | 7/2009 | Maeda et al. | |
| 2010/0052216 A1 | 3/2010 | Kim | |
| 2011/0024948 A1 * | 2/2011 | Takaya | B29C 59/022 |
| | | | 264/293 |
| 2011/0219840 A1 | 9/2011 | Uesugi | |
| 2011/0298159 A1 * | 12/2011 | Jang | B82Y 10/00 |
| | | | 264/447 |
| 2013/0008591 A1 * | 1/2013 | Kondo | B29C 51/06 |
| | | | 156/212 |
| 2013/0136817 A1 * | 5/2013 | Kawaguchi | G03F 7/0002 |
| | | | 425/385 |
| 2013/0139712 A1 | 6/2013 | Lee et al. | |
| 2015/0079354 A1 * | 3/2015 | Sakamoto | G02B 1/118 |
| | | | 428/172 |
| 2017/0072620 A1 | 3/2017 | Kawaguchi et al. | |

FOREIGN PATENT DOCUMENTS

| | | | | |
|---|---|---|---|---|
| JP | 01-178319 | | 7/1989 | |
| JP | 01-217346 A | | 8/1989 | |
| JP | 02-069745 A | | 3/1990 | |
| JP | H02-70412 | | 3/1990 | |
| JP | 02-120861 A | | 5/1990 | |
| JP | 02-282254 A | | 11/1990 | |
| JP | 2001-058352 A | | 3/2001 | |
| JP | 2005-178368 A | | 7/2005 | |
| JP | 2005178368 A | * | 7/2005 | |
| JP | 2006-326948 A | | 12/2006 | |
| JP | 2007-058943 | | 3/2007 | |
| JP | 2008155521 A | * | 7/2008 | |
| JP | 2009-154393 | | 7/2009 | |
| JP | 2009-291949 | | 12/2009 | |
| JP | 2011-183782 | | 9/2011 | |
| JP | 2013-119254 A | | 6/2013 | |
| JP | 2014-172331 A | | 9/2014 | |
| WO | 2004/062886 | | 7/2004 | |
| WO | 2012/029843 A1 | | 3/2012 | |
| WO | WO-2012147958 A1 | * | 11/2012 | ............ B29C 59/02 |
| WO | 2014/088107 A1 | | 6/2014 | |

OTHER PUBLICATIONS

Office Action in U.S. Appl. No. 14/891,429 dated Mar. 15, 2018, 21 pages.

Office Action from U.S. Appl. No. 14/891,429 dated Dec. 20, 2018, 20 pages.

* cited by examiner excellent # ROLLER-TYPE PRESSURIZATION DEVICE, IMPRINTER, AND ROLLER-TYPE PRESSURIZATION METHOD

RELATED APPLICATIONS

This application is a national phase of International Patent Application No. PCT/JP2013/082888, filed Dec. 6, 2013, which claims the filing benefit of Japanese Patent Application No. 2012-267617, filed Dec. 6, 2012, the contents of both of which are incorporated herein by reference.

TECHNICAL FIELD

The present disclosure relates to a roller-type depressing device, an imprint device, and a roller-type depressing method to depress an object with a roller.

BACKGROUND ART

Conventionally, a nano-imprinting technology is known to form a micropattern in a micro order or a nano order. This technology is to depress a die with a micropattern against a molding target like a resin, and to transfer the pattern to the molding target by heat or light (see, for example, Patent Literature 1). In addition, an imprint device is also known which depresses a flexible die with a fluid pressure in order to increase the transfer area (see, for example, Patent Literature 2).

CITATION LIST

Patent Literature

Patent Literature 1: WO2004/062886
Patent Literature 2: JP 2009-154393 A

SUMMARY OF INVENTION

Technical Problem

When a molding target layer formed of a photo-curable resin is applied on a substrate, the molding target layer has unevenness in the thickness. When this molding target layer is depressed with a die that is a rigid body, the molding target layer can be made uniform at the time of molding, but it is difficult to increase the transfer area. Conversely, when a flexible die is depressed with a fluid pressure as explained above, the pressure is uniform throughout all locations. Hence, there is not space to retract air present between the resin and the die or the molding target layer, resulting in a difficulty of eliminating the unevenness of the resin and the air.

In order to address this technical problems, a scheme of making the resin layer uniform with a roller is possible, but in the cases of technologies depressing the roller and the die against the molding target through a position control technology, it is difficult to control the depressing force because of, for example, the circularity of the roller.

Hence, it is an objective of the present disclosure to provide an imprint device and an imprint method which can transfer a micropattern of a die to a molding target while controlling the depressing force by a roller.

Solution to Problem

To accomplish the above objective, a roller-type depressing device of the present disclosure is to depress an object with a main roller, and the device includes: a pressure adjusting plate provided with the main roller; a roller moving unit that moves the main roller relative to the object; a pressure adjusting unit that holds the pressure adjusting plate in such a way that force produced by a pressure difference in fluid applied to both faces of the pressure adjusting plate acts on the main roller; a pressure receiving stage receiving pressure of the main roller via the object; a pressure adjuster that adjusts the pressure difference in fluid applied to both faces of the pressure adjusting plate; and a pressure equalizer that equalizes, in an axial direction thereof, pressure applied to the object by the main roller.

In this case, the pressure adjusting plate may be provided with the roller moving unit. The pressure equalizer may include a backup roller. A plurality of the backup rollers may be disposed back and forth in a moving direction of the main roller. The pressure equalizer may include a backup belt.

The pressure adjusting unit may include a first pressure-adjusting-room component that forms a first pressure adjusting room together with the pressure adjusting plate. The pressure adjuster may include a depressurizer that depressurizes the first pressure adjusting room. Alternatively, the pressure adjuster may include a pressurizer that pressurizes the first pressure adjusting room. In this case, the pressurizer may include an ON-OFF channel that is capable of supplying a gas to the first pressure adjusting room until the fluid pressure applied to both faces of the pressure adjusting plate becomes equal. The first pressure-adjusting-room component may include a cylindrical first frame that forms the first pressure adjusting room together with the object or the pressure receiving stage and the pressure adjusting plate. The roller-type depressing device may further include a second frame which is formed with a hole that can encircles the pressure receiving stage, and which is moved relative to the pressure receiving stage to hold the object together with the first frame, in which the pressure adjuster may be capable of adjusting pressure of a second pressure adjusting room that is formed by the object, the pressure receiving stage, and the second frame. In addition, the roller-type depressing device may further include a position adjuster that adjusts a relative position of the main roller to the first frame in a height direction. Still further, the roller-type depressing device may further include a light source which is disposed at a back side in a moving direction of the main roller, and which emits light to the object along with a movement of the main roller. Yet further, the roller-type depressing device may further include a temperature adjuster that adjusts a temperature of the object.

An imprint device of the present disclosure includes the aforementioned roller-type depressing device.

A roller-type depressing method of the present disclosure is to depress an object with a main roller, and the method includes: a disposing process of disposing the object on a pressure receiving stage; a pressure adjusting process of adjusting pressure applied to the object by the main roller by utilizing a pressure difference in fluid applied to both faces of a pressure receiving plate that supports the main roller; and a depressing process of moving the main roller relative to the object, and depressing the object by the main roller, in which in the depressing process, the pressure adjusting plate depresses the main roller through a pressure equalizer which is disposed between the main roller and the pressure adjusting plate, and which distributes load applied between the main roller and the pressure adjusting plate.

In this case, the object may include a die, and a molding target to which a mold pattern of the die is transferred, and the method may further include, before the disposing process, a depressurizing process of depressurizing an atmosphere between the die and the molding target. In addition, the method may further include, between the depressurizing process and the pressurizing process, an intimate contact process of causing the die and the molding target to intimately contact with each other by uniformly pressurizing the die and the molding target by a fluid pressure. Still further, the method may further include a light emitting process of emitting light to the molding target along with a movement of the main roller using a light source disposed at a back side in a moving direction of the main roller.

Advantageous Effects of Invention

The roller-type depressing device, imprint device, and roller-type depressing method of the present disclosure utilize fluid pressure to depress the roller. Hence, the object like the die or the molding target can be depressed at a constant pressure. In addition, by utilizing the pressure equalizer, pressure of the main roller to the object can be equalized in the axial direction.

It is to be understood that the aspects and objects of the present invention described above may be combinable and that other advantages and aspects of the present invention will become apparent upon reading the following description of the drawings and detailed description of the invention.

DESCRIPTION OF EMBODIMENTS

Figure 1:
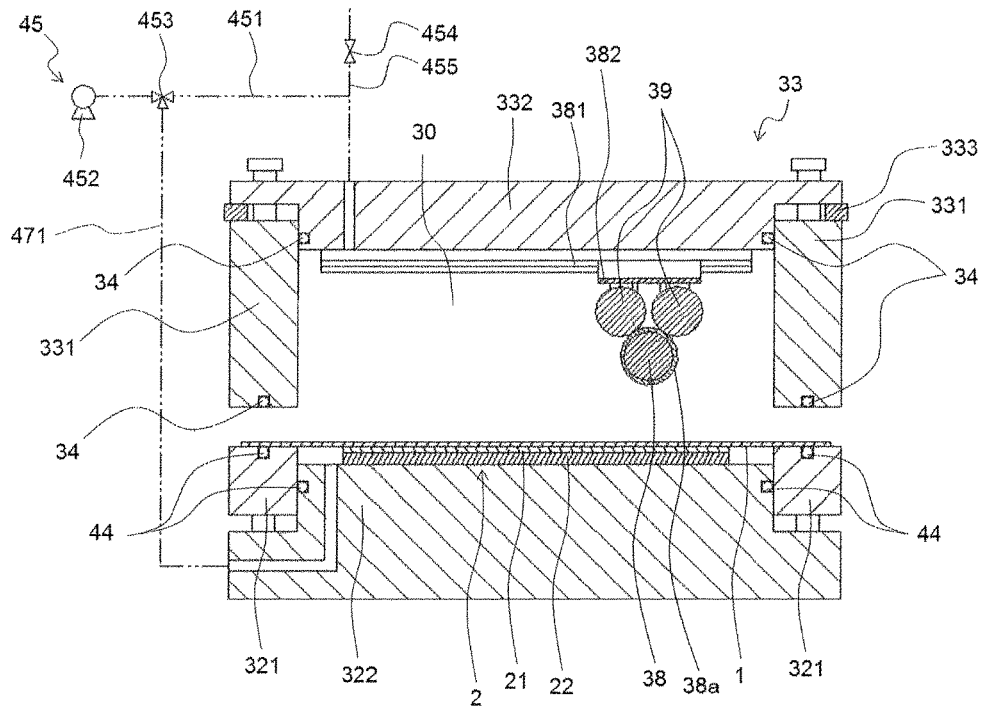
FIG. 1 is an end-face diagram illustrating an imprint device of the present disclosure.

A roller-type depressing device of the present disclosure is to depress an object with a main roller 38, and mainly includes a pressure adjusting plate 332 provided with the main roller 38, a roller moving unit that moves the main roller 38 relative to the object, a pressure adjusting unit that holds the pressure adjusting plate 332 in such a way that force produced by a pressure difference in fluid applied to both faces of the pressure adjusting plate 332 acts on the main roller 38, a pressure receiving stage 322 receiving the pressure of the main roller 38 via the object, a pressure adjuster that adjusts the pressure difference in fluid applied to both faces of the pressure adjusting plate 332, and a pressure equalizer (backup rollers 39) that equalizes pressures applied to the object by the main roller 38 in the axial direction.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Note that in this specification, the term object means one depressed by the main roller 38, but is not necessary as being a single component, and may be multiple components. When, for example, the roller-type depressing device of the present disclosure is built in an imprint device, the object means both die 1 and molding target 2. In addition, the purpose to depress the object is not limited to a deformation of the object. For example, the depressing may be performed to repel air present between the die 1 and the molding target 2. In the following explanation and FIGS. 1 to 8, it is presumed that the roller-type depressing device of the present disclosure is built in an imprint device, and the object is a die and a molding target both utilized in imprinting.

The die 1 is formed of, for example, a "metal like nickel", "ceramics", a "carbon material like glass-like carbon", or "silicon", and has a predetermined mold pattern formed on one end face (molding face). This mold pattern can be formed by applying precise machining process to the molding face. In addition, the mold pattern can be formed by applying semiconductor microfabrication technology like etching to a silicon substrate, etc., or by applying an electro-forming technique like nickel plating to the surface of the silicon substrate to form a metal plating layer, and by peeling this metal plating layer. Still further, a resin-made die formed through an imprint technology is also applicable. In this case, the die may be formed as a flexible film relative to the molding target surface of the molding target 2. Needless to say, the material of the die 1 and the production scheme thereof are not limited to any particular ones as long as it can transfer a mold pattern.

The mold pattern formed on the die 1 is not limited to a geometrical shape with concavities and convexities, but includes a transfer of a predetermined surface condition like a transfer of a mirror condition with a predetermined surface roughness. In addition, the mold pattern can be formed in various sizes such that the minimum dimension of the width of the concavity and that of the convexity in the planar direction is equal to or smaller than 100 μm, equal to or smaller than 10 μm, equal to or smaller than 2 μm, equal to or smaller than 1 μm, equal to or smaller than 100 nm, and equal to or smaller than 10 nm. Still further, the dimension in the depthwise direction can be also formed in various sizes, such as equal to or larger than 10 nm, equal to or larger than 100 nm, equal to or larger than 200 nm, equal to or larger than 500 nm, equal to or larger than 1 μm, equal to or larger than 10 μm, and equal to or larger than 100 μm.

The molding target 2 means one including a substrate 22 formed of a resin, an inorganic compound or a metal, and a film molding target layer 21 with fluidity formed on the substrate or the film, but may be simply a substrate itself or a flexible film. The molding target layer 21 with fluidity may be formed on the die 1, and the molding target layer may be joined with the substrate when the substrate and the die 1 are depressed. An example material of the molding target 2 is a photo-curable resin, a thermosetting resin, or a thermoplastic resin.

Example photo-curable resin or thermosetting resin is epoxide-containing compounds, (metha) acrylate ester compounds, or unsaturated hydrocarbon-radial containing compounds of vinyl radial and allyl radial, such as vinyl ether compounds, bisallylnadimide compounds. In this case, for the purpose of a thermal polymerization, a polymerization reaction radial containing compound can be applied in solo, or an initiator with a thermal reactivity may be added to improve the thermal curing. In addition, a photoreactive initiator may be added to let a polymerization reaction advanced upon irradiation with light, thereby forming a mold pattern. Example radial initiators with a thermal reactivity suitable are organic peroxide and azo compound, and example photoreactive radial initiators suitable are acetophenone derivative, benzophenone derivative, benzoin ether derivative, and xanthone derivative. The reactive monomer may be utilized in a solventless form, or may be dissolved in a solvent and desolvated after application.

Example thermoplastic resins are olefin-based resins, such as cyclic-olefin ring-open polymer/hydrogen added substance (COP) and cyclic-olefin copolymer (COC), an acrylic resin, polycarbonate, a vinyl-ether resin, fluorine resins, such as perfluoroalkoxyalkane (PFA) or polytetrafluoroethylene (PTFE), polystyrene, a polyimide-based resin, and a polyester-based resin.

In FIG. 1, the molding target 2 is disposed at the pressure-receiving-stage-322 side, while the die 1 is disposed at the main-roller-38 side, but the die 1 may be disposed at the pressure-receiving-stage-322 side, while the molding target 2 may be disposed at the main-roller-38 side. In addition, in the die 1 and the molding target 2, it is preferable that the one disposed at the main-roller-38 side should be formed as a flexible film.

The main roller 38 is formed in, for example, a cylindrical shape, holds the die 1 and the molding target 2 that are the objects together with the pressure receiving stage 322, and depresses those objects. The main roller 38 is rotatable, and when the roller moving unit moves the main roller 38, the rolling main roller 38 depresses the die 1 and the molding target 2. The material of the roller 38 is not limited to any particular one as long as it matches the molding condition, but when, for example, the main roller is applied to an imprinting process, it is desirable that the material should have the pressure resistance and the heat resistance under the molding condition. In addition, in order to surely apply pressure, an elastically deformable material 38a within a suitable range is also applicable to the surface of the main roller, and for example, a urethane resin is applicable. In this case, the thickness can be set as needed, but in the case of a urethane resin, the thickness may be set to substantially 5 to 10 mm.

The pressure adjusting plate 332 is provided with the main roller 38, etc., and applies force produced by a pressure difference in fluid applied to both faces of the pressure adjusting plate to the main roller 38. The material of the pressure adjusting plate 332 is not limited to any particular one as long as it can match the molding condition, but when, for example, the pressure adjusting plate is applied to an imprinting process, one having the pressure resistance and the heat resistance under the molding condition is preferable, and a metal like stainless-steel is applicable.

Figure 7:
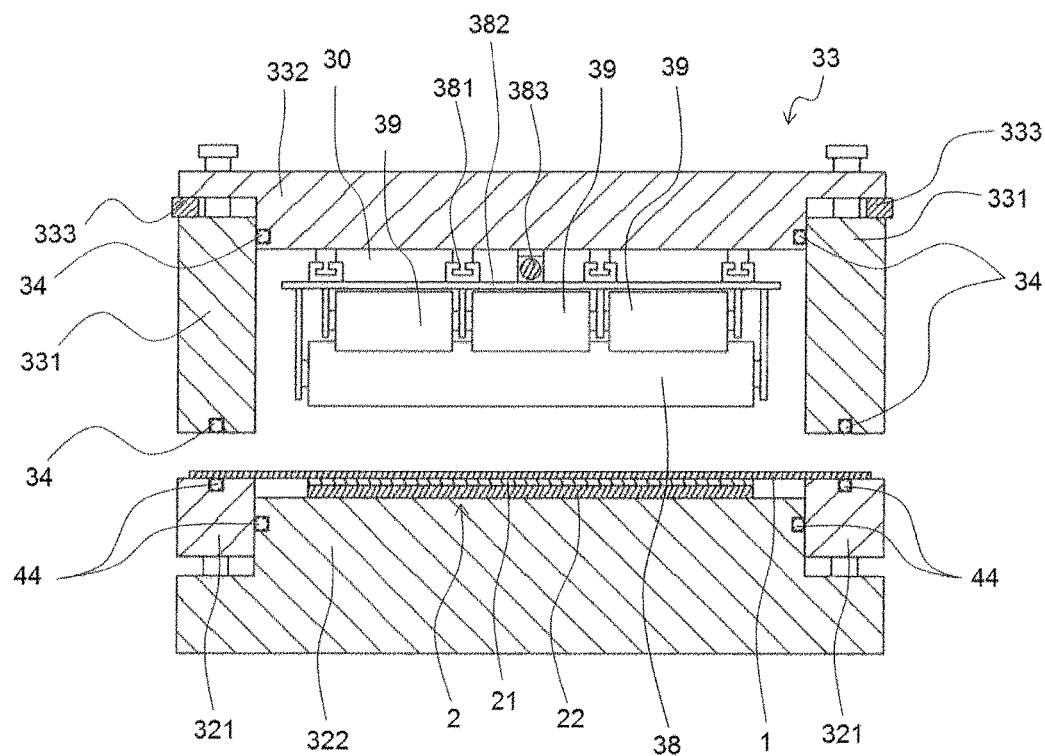
FIG. 7 is an end-face diagram illustrating the imprint device of the present disclosure.

In general, the main roller 38 is axially supported at both ends thereof. In order to increase the transfer area, it is preferable to elongate the main roller 38 in the axial direction. When, however, the main roller 38 becomes too long, the pressure at both ends of the supported main roller 38 is large, but the pressure decreases toward the center of the main roller. Hence, according to the imprint device of the present disclosure, the pressure equalizer that equalizes the pressure of the main roller 38 in the axial direction is further provided. An example pressure equalizer is backup rollers 39 which are disposed between the main roller 38 and the pressure adjusting plate 332, and which supports the center portion of the main roller 38. More specifically, as illustrated in FIGS. 1 and 7, the backup rollers 39 are each formed in a cylindrical shape that is shorter than the main roller 38 in the axial direction, and are disposed so as to support force produced between the pressure adjusting plate 332 and the main roller 38 through both ends of the backup roller in the axial direction. According to this structure, the backup rollers 39 turn around both ends together with the turning of the main roller 38, and support the main roller 38. As illustrated in FIG. 1, it is preferable that the two backup rollers 39 should be disposed between the main roller 38 and the pressure adjusting plate 332, and back and forth in the moving direction of the main roller. When the backup rollers 39 are provided back and forth in the moving direction in this manner, it becomes possible to prevent the rotation axis of the main roller 38 from being shifted back and forth, thereby stabilizing the rotation axis. Needless to say, the number of the backup rollers 39 is not limited to two, and may be one or equal to or greater than three.

The pressure equalizer is not limited to the backup rollers 39 as long as it can equalize the pressure of the main roller 38 in the axial direction, and it is not illustrated in the figure but a backup belt which is provided between the main roller 38 and the pressure adjusting plate 332, and which supports the center portion of the main roller 38 may be adopted. The backup belt may be disposed around a roller, etc., supported by the pressure adjusting plate 332 and may be supported by such a roller.

The roller moving unit is to move the main roller 38 relative to the object that is the die 1 or the molding target 2, and to depress the whole molding face of the die 1 against the molding target 2. The roller moving unit is not limited to any particular structure as long as it can move the main roller 38, but includes, for example, a moving plate 382 movable on guide rails 381 provided on the pressure adjusting plate 332, a screw 383 which is disposed on the pressure adjusting plate 332, and which converts the rotation motion into the linear motion of the moving plate 382, and an electric motor (unillustrated) that turns the screw 383. In addition, the main roller 38 and the backup rollers 39 may have respective both ends of the rotation axes fixed to the moving plate. In this case, it is preferable that force applied to the main roller 38 should be mainly supported by the backup roller 39. Hence, in order to apply no load to both axial ends of the main roller 38, a play that permits both axial ends to move horizontally or vertically may be provided. For example, the shaft of the main roller 38 may be held by holes slightly larger than the diameter of the shaft of the main roller. Moreover, in order to appropriately support force applied to the backup rollers 39, it is preferable that the guide rails 381 should be disposed in a manner aligned with both ends of the backup rollers 39. The roller moving unit may be a manual mechanism that turns the screw 383 through a handle instead of the electric motor.

The pressure adjusting unit holds the pressure adjusting plate 332 in such a way that force produced by a pressure difference in fluid applied to both faces of the pressure adjusting plate 332 acts on the object through the main roller 38. The pressure adjusting unit includes a first pressure-adjusting-room component that forms a first pressure adjusting room 30 together with the pressure adjusting plate 332. For example, as illustrated in FIGS. 1 to 5, a first frame 331 (first pressure-adjusting-room component) and the pressure adjusting plate 332 form a casing 33 in a cylindrical shape with a bottom and an opened portion. Next, when the opened portion of the casing 33 is closed by the die 1, the molding target 2 or the pressure receiving stage 322, the first pressure adjusting room 30 that is a sealed space is formed. At this time, as to the first frame 331 and the pressure adjusting plate 332, the pressure adjusting plate 332 is freely movable relative to the first frame 331 by a pressure difference in fluid applied to both faces of the pressure adjusting plate 332. For example, as illustrated in FIG. 1, the first frame 331 is formed as a rectangular cylinder having a hole serving as the opened portion of the casing 33 and having a dimension so as to be able to abut the stage 322. Such a hole (opened portion) is formed larger than at least the molding face of the die 1. In addition, the pressure adjusting plate 332 is formed in a shape having a convexed cross-section constructed by a pressure-adjusting-plate main body fittable with the hole of the first frame 331, and a flange extending horizontally from the pressure-adjusting-plate main body and abutting the end of the first frame 331. When the pressure adjusting unit is constructed as explained above, since the pressure adjusting plate 332 is freely movable relative to the first frame 331, force produced by a pressure difference in fluid applied to both faces of the pressure adjusting plate 332 can act on the main roller 38. Although the position of the main roller 38 is changed due to the circularity of the main roller 38 and the distortion of the device, etc., the pressure adjusting plate 332 can freely move in accordance with such an event. Hence, a constant fluid pressure can be applied to the main roller 38. Note that the material of the first frame 331 is not limited to any particular ones as long as it can match the molding condition, but when, for example, the first frame is applied to an imprinting process, it is preferable that such a material should have the pressure resistance and the heat resistance under the molding condition, and for example, a metal like stainless-steel is applicable. It is not illustrated in the figure but a guide that supports the pressure adjusting plate in parallel with the die 1 and the molding target may be further provided between the first frame 331 and the pressure adjusting plate 332. According to this structure, the pressure adjusting plate 332 can be stably held although the main roller 38 moves.

In order to surely seal the first pressure adjusting room 30, a first pressure adjusting room sealer 34 to intimately seal a space between the first frame 331 and the pressure adjusting plate 332 and a space between the first frame 331 and the die 1 or the molding target 2 may be further provided. For example, as illustrated in FIG. 1, the first pressure adjusting room sealer 34 that is an O-ring is prepared, a concave groove shallower than the diameter of the cross-section of the O-ring is formed in the side end of the pressure receiving stage, and the O-ring can be disposed in this groove. In addition, a concave groove shallower than the diameter of the cross-section of the O-ring may be formed in the outer circumference of the pressure adjusting plate 332 contacting the first frame 331, and the O-ring may be disposed in this groove. Needless to say, a concave groove shallower than the diameter of the cross-section of the O-ring may be formed in the inner circumference of the first frame 331 contacting the pressure adjusting plate 332, and the O-ring may be disposed in this groove.

It is not illustrated in the figure, but it is preferable that a first moving unit that moves the pressure receiving stage close to or distant from the casing 33 should be provided. An example first moving unit is a hydraulic or pneumatic cylinder that moves the first frame 331, or a combination of an electric motor and a ball screw that move the first frame.

The pressure adjusting unit is not limited to the above-explained example, and for example, the pressure adjusting room 30 may be disposed below the die 1 and the molding target 2, and at a side of the pressure receiving stage 332. In this case, when the interior of the pressure adjusting room 30 is depressurized to produce a pressure difference between both faces of the pressure adjusting plate 332, the main roller 38 can be pressed against the die 1 and the molding target 2. According to this structure, since the roller 38 and the roller moving unit are disposed outside the pressure adjusting room 30, the volume of the pressure adjusting room 30 can be reduced. Hence, the amount of gas discharged at the time of depressurization can be reduced, thereby improving a throughput.

Figure 8:
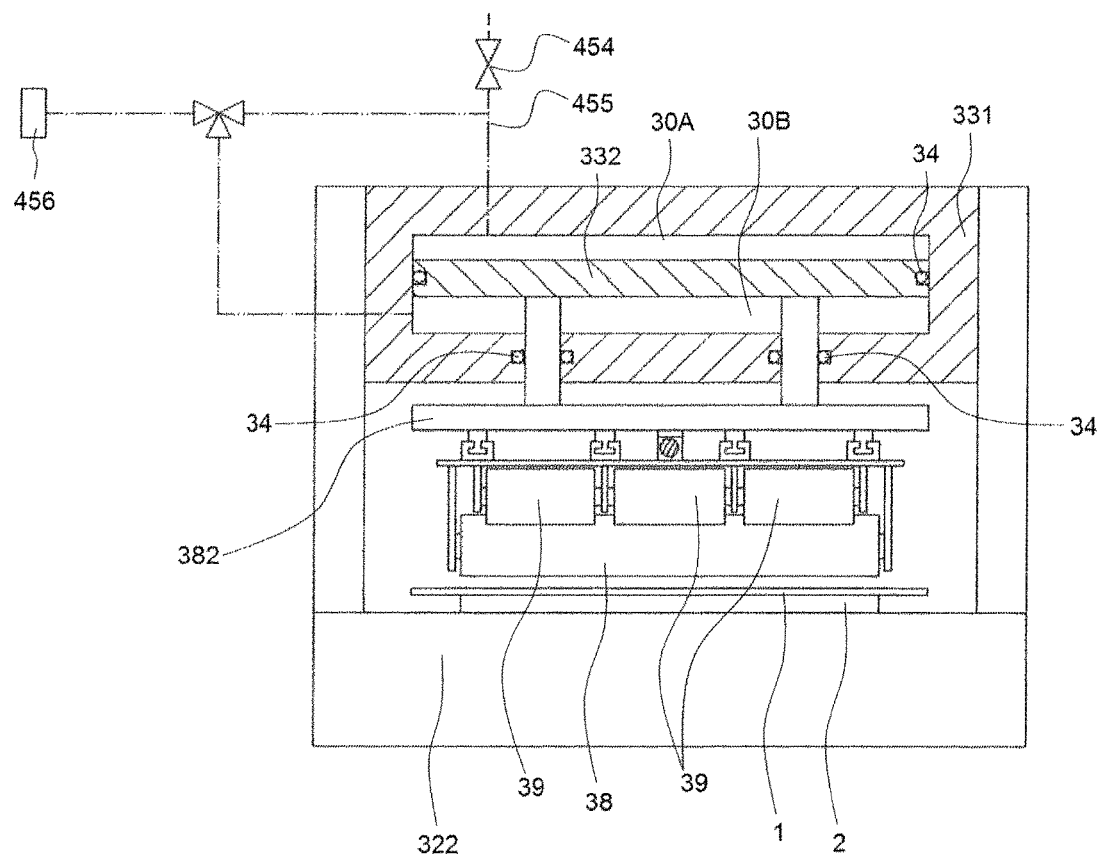
FIG. 8 is a partial cross-sectional view illustrating the imprint device of the present disclosure.

In addition, as illustrated in FIG. 8, pressure adjusting rooms 30A, 30B may be provided at both faces of the pressure adjusting plate 332. In this case, by producing a pressure difference between both faces of the pressure adjusting plate 332 using a pressure adjuster 45, it becomes possible not only to allow the roller to depress, but also to ascend/descend the roller. However, one pressurizing the interior of the pressure adjusting room 30 often needs a structure to support reactive force at the time of pressurization, and thus the larger the pressurizing force is, the more the device increases its size and costs. Hence, in view of this point, it is preferable to depressurize the interior of the pressure adjusting room 30 as a scheme of producing a pressure difference between both faces of the pressure adjusting plate 332.

The pressure receiving stage 322 receives the pressure by the main roller 38 via the objects that are the die 1 and the molding target 2. In the pressure receiving stage 322, the pressure receiving face that is a surface contacting the die 1 or the molding target 2 is formed so as to be sufficiently large and smooth. This pressure receiving face can be formed in a planar shape or a curved shape in accordance with the shape of the die 1 and that of the molding target 2 to be supported. The material is not limited to any particular one as long as it matches the molding condition, but when, for example, the pressure receiving face is applied to an imprinting process, it is preferable that the material should have the pressure resistance and the heat resistance under the molding condition, and for example, a metal like stainless-steel is applicable. When the die 1 or the molding target 2 is heated from the pressure-receiving-stage-322 side, it is desirable to use a material like a metal having a high thermal conductivity. Conversely, when the die 1 or the molding target 2 is heated from the first-pressure-adjusting-room-30 side, it is fine if a material with a low thermal conductivity is applied in order to prevent heat from escaping to the pressure receiving stage 322, but in order to suppress an uneven heating, it is preferable that the pressure receiving face should be formed of a material having a high thermal conductivity. In an optical imprinting process, when a light source is disposed at the pressure-receiving-stage-322 side, it is appropriate if a transparent material like a glass is applied. In order to suppress a causing of unnecessary transfer trace on the molding target 2, the die 1 and the pressure receiving stage 322 may be formed integrally with each other. For example, according to conventional technologies, a pattern is formed by electroforming, and only the pattern portion is cut out and is utilized, but it can be directly used without a cut-out.

Figure 3:
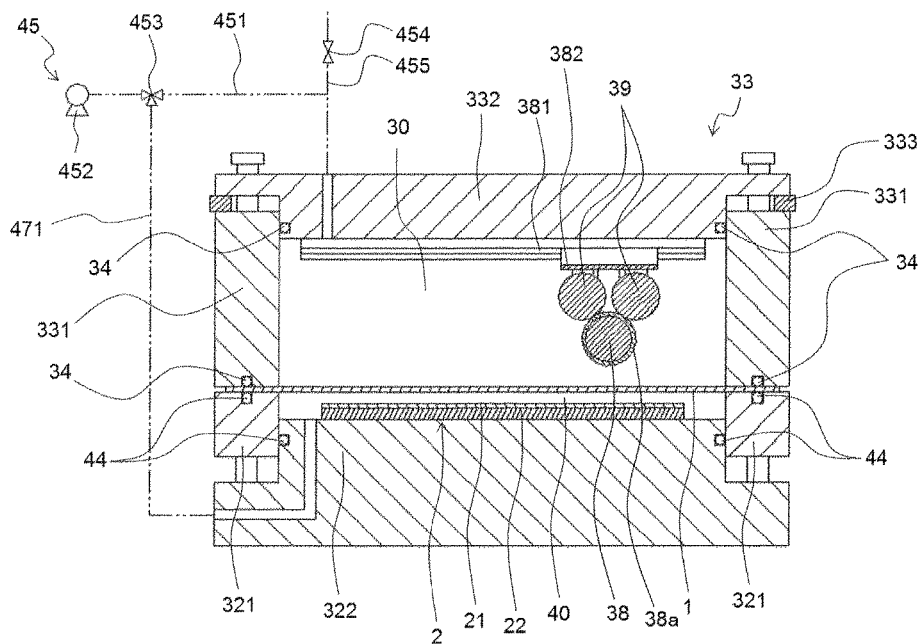
FIG. 3 is an end-face diagram illustrating the imprint device of the present disclosure.

In addition, it is fine if a second frame 321 which is movable relative to the pressure receiving stage 322 and which holds the die 1 or the molding target 2 together with the first frame 331 is provided. The second frame 321 may be formed in, for example, a cylindrical shape which encircles the pressure receiving stage 322 and which surrounds the outer circumference of the pressure receiving stage 322. By forming the second frame in this manner, as illustrated in FIG. 3, the second frame frame 321 is moved relative to the pressure receiving stage 322 to form a second pressure adjusting room 40. In this case, the second pressure adjusting room 40 is to depressurize the atmosphere between the die 1 and the molding target 2. Hence, gas present between the die 1 and the molding target 2 or between those and the pressure receiving stage 322 can be eliminated, allowing the die 1 and the molding target 2 to be uniformly depressed against each other. The material of the second frame 321 is not limited to any particular one as long as it can match the molding condition, but when, for example, the second frame is applied to an imprinting process, it is preferable that the material should have the pressure resistance and the heat resistance under the molding condition, and for example, a metal like stainless-steel is applicable.

To move the second frame 321 and the pressure receiving stage 322 relative to each other, a second moving unit 46 is suitably provided. The second moving unit 46 can be any structure as long as it moves the first frame 331 and the second frame 321 close to or distant from each other, and for example, a hydraulic or pneumatic cylinder that moves the second frame 321 or a combination of an electric motor and a ball screw that move the second frame is applicable.

When no second frame 321 is provided, the pressure receiving stage 322 is formed in a size which can abut the first frame 331, and which can form the first pressure adjusting room.

In order to surely seal the second pressure adjusting room 40, a second pressure adjusting room sealer 44 to intimately seal a space between the second frame 321 and the pressure adjusting plate 332 and a space between the second frame 321 and the die 1 or the molding target 2 may be further provided. For example, as illustrated in FIG. 1, the second pressure adjusting room sealer 44 that is an O-ring is prepared, a concave groove shallower than the diameter of the cross-section of the O-ring is formed in the side end of the second frame 321 at the casing-33 side, and the O-ring can be disposed in this groove. In addition, a concave groove shallower than the diameter of the cross-section of the O-ring may be formed in the outer circumference (second-frame-321 side) of the pressure receiving stage 322, and the O-ring may be disposed in this groove. Needless to say, a concave groove shallower than the diameter of the cross-section of the O-ring may be formed in the inner circumference (pressure-receiving-stage-322 side) of the second frame 321, and the O-ring may be disposed in this groove.

Figure 5:
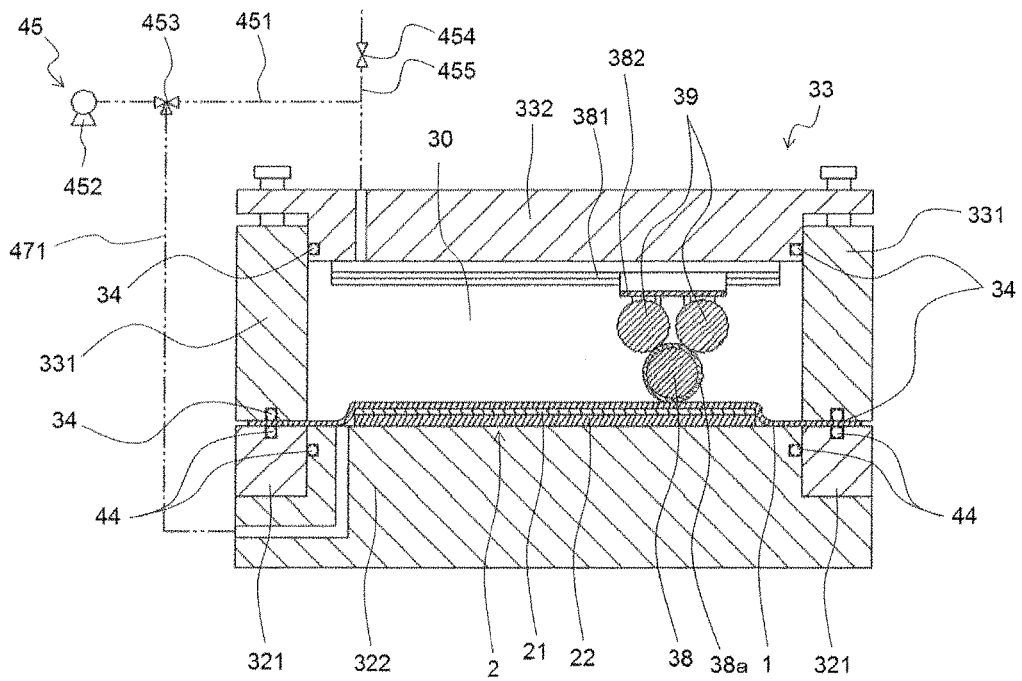
FIG. 5 is an end-face diagram illustrating the imprint device of the present disclosure.
Figure 6:
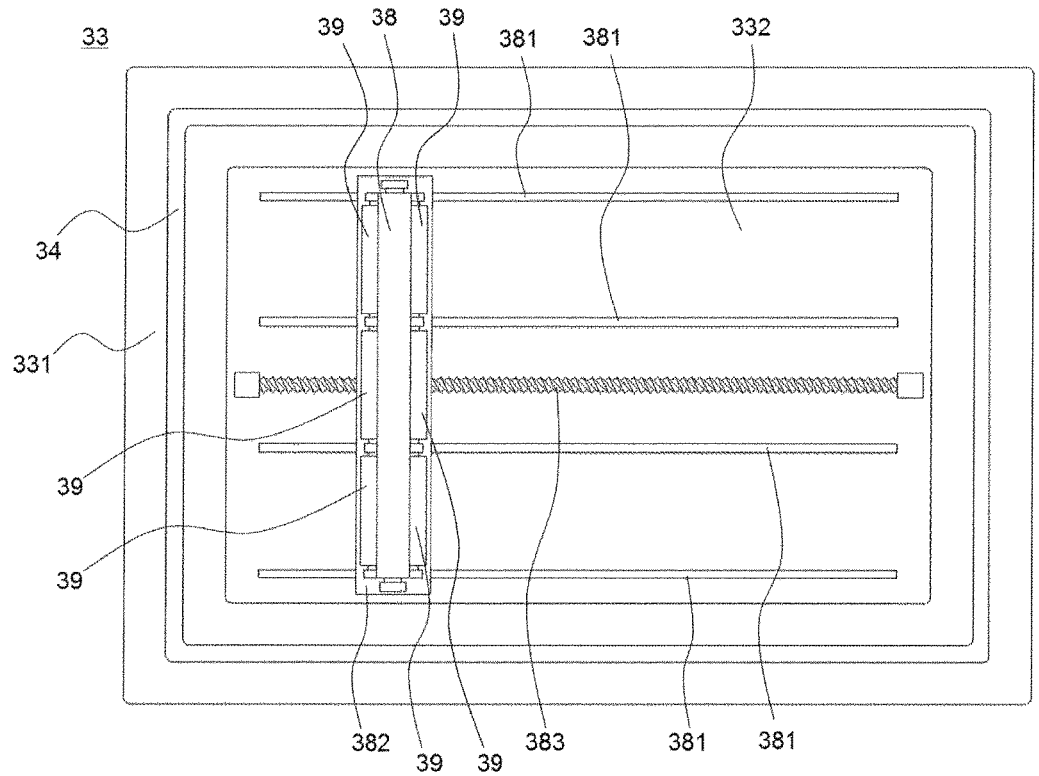
FIG. 6 is a plan view illustrating a casing of the imprint device of the present disclosure.

In order to adjust the relative position of the main roller 38 to the first frame 331 in the height direction, it is preferable to further provide a position adjuster 333. Hence, when the second pressure adjusting room 40 is formed, the lower end of the main roller 38 is positioned at a location where no excessive force is applied to the die 1 or the molding target 2 held by the first frame 331 and the second frame 321, preferably, a location not contacting those. For example, as illustrated in FIG. 3, it is appropriate if the position of the lower end of the main roller 38 is set to be higher than the position of the lower end of the first frame 331. Conversely, when the die 1 and the molding target 2 are superimposed and depressed by the main roller 38, as illustrated in FIG. 5, it is appropriate if the lower end of the main roller 38 is adjusted to a location so as to contact the die 1 and to apply predetermined pressure to the die 1 and the molding target 2.

An example position adjuster 333 is a spacer disposed between the pressure adjusting plate 332 and the first frame 331 as illustrated in FIG. 1. This spacer may be automatically inserted in or taken out from between the pressure adjusting plate 332 and the first frame 331. Another example position adjuster is an elastic body like a spring disposed between the pressure adjusting plate 332 and the first frame 331 although it is not illustrated in the figure. Hence, when there is no pressure difference between both faces of the pressure adjusting plate 332, the lower end of the roller 38 can be adjusted to a position not applying excessive force to the die 1 or the molding target 2 held by the first frame 331 and the second frame, more preferably, a position not contacting those by the spring force. Conversely, when a pressure difference is produced between both faces of the pressure adjusting plate 332, and counterforce equal to or larger than the elastic force by the elastic body is applied to the pressure adjusting plate 332, predetermined pressure can be applied to the die 1 and the molding target 2.

The pressure adjuster 45 is to adjust a pressure difference in fluid applied to both faces of the pressure adjusting plate 332. An example pressure adjuster 45 is a depressurizer that depressurizes the fluid pressure on the one surface of the pressure adjusting plate 332 or a pressurizer that pressurizes the fluid pressure.

When the depressurizer is utilized as the pressure adjuster 45, as illustrated in FIG. 1, in order to pressurize the die 1 and the molding target 2 by the roller 38, it is appropriate if, in the fluid pressures applied to both faces of the pressure adjusting plate 332, the pressure at the first-pressure-adjusting-room-30 side is adjusted so as to be relatively small. Hence, force produced by a pressure difference applied to the pressure adjusting plate 332 can act on the main roller 38, and thus the pressurizing force by the main roller 38 can be adjusted to a predetermined pressure.

When the pressurizer is utilized as the pressure adjuster 45, as illustrated in FIG. 8, in order to depress the die 1 and the molding target 2 by the main roller 38, it is appropriate if, in the fluid pressures applied to both faces of the pressure adjusting plate 332, the pressure at the first-pressure adjusting-room-30 side is adjusted so as to be relatively large. As will be described later, when the pressurizer is utilized as the pressure adjuster, the device becomes applicable to execute an intimate contact process and a fluid pressurizing process in an imprinting process.

As explained above, as the pressure adjuster 45, there are schemes of utilizing a depressurizer or a pressurizer, but as already discussed before, when the pressurizer is provided, a structure of supporting reactive force against the pressure force is necessary, and thus the device increases the size and costs. Accordingly, when the depressurizer is provided, there are advantages that the structure of the device can be simplified, and the costs can be reduced.

For example, as illustrated in FIG. 1, the depressurizer may include a first-pressure-adjusting-room gas supply/discharge channel 451 connected to the first pressure adjusting room 30, and a depressurizing pump 452 that discharges gas in the first pressure adjusting room 30 through the first-pressure-adjusting-room gas supply/discharge channel 451. In addition, in order to let the first pressure adjusting room 30 to return to the atmospheric pressure, an ON-OFF channel 455 is provided through an ON-OFF valve 454.

When the second frame 321 is provided to form the second pressure adjusting room 40, the pressure adjuster 45 is configured to be able to also adjust the pressure of the second pressure adjusting room 40. More specifically, the first pressure adjusting room 30 and the second pressure adjusting room 40 are depressurized to eliminate gas present between the die 1 and the molding target 2. Hence, when depressed by the main roller 38, it becomes possible to prevent a transfer failure due to remaining gas between the die 1 and the molding target 2. The first pressure adjusting room 30 and the second pressure adjusting room 40 are adjusted so as to be the same pressure. Hence, the die 1 or the molding target 2 present between the first pressure adjusting room 30 and the second pressure adjusting room 40 is not deflected due to a pressure difference, and the gas present between the die 1 and the molding target 2 can be surely eliminated. For example, when a communication channel 471 that causes the first pressure adjusting room 30 to be in communication with the second pressure adjusting room 40 is provided, the pressure of the first pressure adjusting room 30 and that of the second pressure adjusting room 40 can be easily adjusted to be the same pressure. The communication channel 471 may be provided in either one of the pressure receiving stage 322 or the second frame 321. In addition, as illustrated in FIG. 1, as a part of the communication channel 471, the first-pressure-adjusting-room gas supply/discharge channel 451 may be utilized through a three-way valve 453. As another example structure, the pressure difference between the first pressure adjusting room 30 and the second pressure adjusting room 40 may be adjusted based on pressure sensors that detect respective pressures of the first pressure adjusting room 30 and the second pressure adjusting room 40.

After the gas present between the die 1 and the molding target 2 is eliminated, the die 1 and the molding target 2 are superimposed, and the ON-OFF channel 455 is opened through the ON-OFF valve 454 to let the first pressure adjusting room 30 to return to the atmospheric pressure. Hence, the die 1 and the molding target 2 can intimately contact with each other.

Conversely, when the pressurizer is provided, as illustrated in FIG. 8, a pressurizing tank 456, etc., that supplies a fluid like compressed air to the pressure adjusting rooms 30A, 30B may be utilized.

Although it is not illustrated in the figure, the imprint device of the present disclosure may include a fluid spray which sprays a fluid like gas between the die 1 and the molding target 2 and which is provided in the second frame 321. Hence, the casing 33 is moved apart from the pressure receiving stage 322 while holding the die 1 (or the molding target 2) with the first frame 331 and the second frame 321 to form a space between the end of the die 1 and that of the molding target 2 intimately contacting with each other, and the fluid is sprayed to this space, thereby demolding the die 1 from the molding target 2.

The fluid spray mainly includes, for example, a spray nozzle provided in the inner circumference side wall of the second frame 321, and spraying a fluid between the die 1 and the molding target 2, a flow-rate adjuster adjusting the flow rate of the fluid sprayed from the spray nozzle, a demolding fluid supply source supplying the fluid to the spray nozzle, and a demolding fluid supply channel for flowing the fluid from the demolding fluid supply source to the spray nozzle.

The spray nozzle may be slits formed along the inner circumference side wall of the second frame 321. The width of the slit can be adjusted in accordance with the sticking force between the die 1 and the molding target 2, but for example, a width of 0.2 to 05 mm is applicable. In addition, multi-nozzles having multiple ports provided at an appropriate pitch along the end of the molding target 2 are also applicable. The angle of the spray nozzle may be oriented with the direction of the intimately contacting faces between the die 1 and the molding target 2, or may be in parallel with the intimately contacting faces.

In addition, it is preferable that the spray nozzle should be provided in at least two directions facing across the molding target 2, more preferably, four directions. Hence, the fluids sprayed from the opposing positions collide at the center between the die 1 and the molding target 2. In this case, the fluid loses the speed, changes from dynamic pressure to static pressure, and the static pressure at the colliding location becomes higher than the pressure of the upper face of the molding target 2. Accordingly, the molding target 2 is lifted up. Hence, the energy of the sprayed fast-speed fluid is converted into static pressure, and thus the fluid that instantly eliminates peeling caused at the wall face, eddying flow, and shear stress prevents the pattern transferred on the molding target 2 from being, for example, damaged.

The flow-rate adjuster is not limited to any particular one as long as it can adjust the flow rate of the fluid sprayed from the spray nozzle, but for example, one adjusting the flow rate based on pressure and spray time is applicable. More specifically, a fluid pressurized at 0.2 to 0.5 MPa by an accumulator may be sprayed as pulses of 50 to 300 ms.

An example demolding fluid supply source is an air compressor supplying gas to the spray nozzle or a tank, etc., that reserves a compressed gas.

It is not illustrated in the figure but a temperature adjuster that adjusts the temperature of the molding target layer 21 by heating or cooling it may be further provided. Hence, the fluidity, etc., of the molding target layer 21 can be adjusted. When the imprint device of the present disclosure is applied to thermal imprinting, the molding target 2 can be heated to a temperature equal to or higher than the glass transition temperature, and depressed while the main roller 38 is rolled to flatten the molding target layer. An example temperature adjuster is a heater that directly or indirectly heats the molding target layer 21 or a cooler that cools the molding target layer.

The heater is not limited to any particular one as long as it can heat the molding target layer 21 to a predetermined temperature, e.g., equal to or higher than the glass transition temperature or melting temperature of the molding target layer 21. In addition, the heater may heat the molding target layer 21 from the pressure-receiving-stage-322 side or from the first-pressure-adjusting-room-30 side. For example, a heater may be provided in the roller 38 or the pressure receiving stage 322 to heat the molding target layer 21 from the pressure-receiving-stage-322 side. Still further, a radiant heat source, such as a ceramic heater or a halogen heater, that emits electromagnetic waves to perform heating may be provided in the first pressure adjusting room 30 to heat the molding target layer 21. The molding target layer can be heated using a heated liquid or gas.

The cooler is also not limited to any particular one as long as it can cool the molding target layer 21 to a predetermined temperature. In addition, the cooler may cool the molding target layer 21 from the pressure-receiving-stage-322 side or from the first-pressure-adjusting-room-30 side. For example, a water jacket for cooling may be provided in the pressure receiving stage 322 to cool the molding target layer 21 from the pressure-receiving-stage-322 side.

When the imprint device of the present disclosure is applied to an optical imprinting process, it is appropriate if a light source that emits electromagnetic waves with a predetermined wavelength to the molding target layer 21 is provided in the first pressure adjusting room 30 or the pressure receiving stage 322. It is not illustrated in the figure, but a casing with an opened portion may be disposed at the back side in the moving direction of the main roller 38 in a movable manner, and the light source may be disposed in such a casing. According to this structure, the number of light sources and the output thereof can be reduced.

It is not illustrated in the figure but a carrier to carry the die 1 or the molding target 2 may be further provided. For example, a feeding roll that supplies the resin film (molding target 2) and a collecting roll that collects the resin film to which the mold pattern is transferred are disposed so as to face with each other across the pressure receiving stage 322. This structure enables a successive pattern transfer.

The explanation was given of an example case in which the roller-type depressing device of the present disclosure is applied to an imprint device that transfers the mold pattern of the die 1 to the molding target 2, but the roller-type depressing device is not limited to such an example application. For example, in a fluid depressing type imprint device that depresses the whole surface of the die with a fluid pressure, in order to simply push out and take out in advance bubbles present between the die 1 and the molding target 2, the roller-type depressing device is applicable.

Next, an explanation will be given of a roller-type depressing method according to the present disclosure. The roller-type depressing method of the present disclosure is to depress the object with the main roller 38, and mainly includes a disposing process of disposing the object on the pressure receiving stage 322, a pressure adjusting process of adjusting the pressure applied by the main roller 38 to the object by utilizing a fluid pressure difference applied to both faces of the pressure receiving plate 332 that supports the main roller 38, and a depressing process of moving the main roller 38 relative to the object, and depressing the object with the main roller 38. In this depressing process, the pressure adjusting plate 332 applies pressure to the roller 38 through a pressure equalizer which is disposed between the main roller 38 and the pressure adjusting plate 332, and which distributes loads applied between the main roller 38 and the pressure adjusting plate 332.

An explanation will be below given of a case in which the roller-type depressing device of the present disclosure is applied to imprinting together with an operation of the imprint device of the present disclosure. This imprinting is to transfer the mold pattern of the die 1 to the molding target 2, and mainly includes a disposing process of disposing the die 1 and the molding target 2 in a superimposed manner on the pressure receiving stage 322, a pressure adjusting process of adjusting the pressure applied by the main roller 38 to the die 1 and the molding target 2 by utilizing a fluid pressure difference applied to both faces of the pressure receiving plate 332 that supports the main roller 38, and a depressing process of moving the main roller 38 relative to the die 1 and the molding target 2, and depressing the die 1 and the molding target 2 with the main roller 38. In this depressing process, the pressure adjusting plate 332 applies pressure to the roller 38 through a pressure equalizer which is disposed between the main roller 38 and the pressure adjusting plate 332, and which distributes loads applied between the main roller 38 and the pressure adjusting plate 332.

It is preferable that a depressurizing process of depressurizing the atmosphere between the die 1 and the molding target 2 should be provided before the disposing process. In addition, it is preferable that an intimate contact process of uniformly depressing the die 1 and the molding target 2 to let the die and the molding target to intimately contact with each other should be provided between the depressurizing process and the disposing process.

Figure 2:
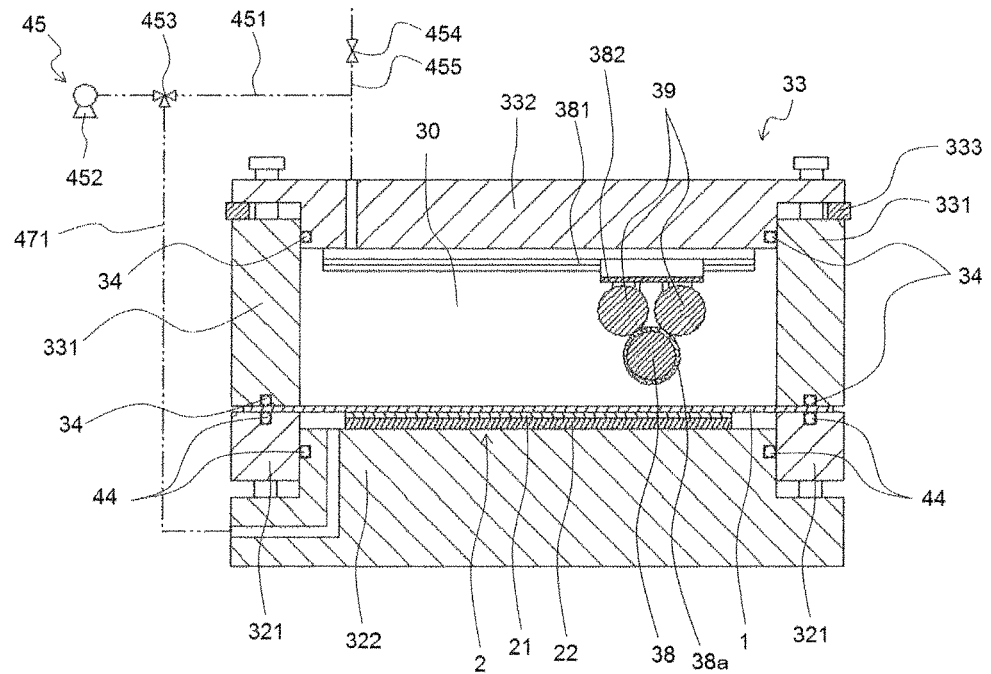
FIG. 2 is an end-face diagram illustrating the imprint device of the present disclosure.

In the depressurizing process, first, as illustrated in FIG. 2, the die 1 is held between the first frame 331 and the second frame 321, and as illustrated in FIG. 3, the pressure receiving stage 322 and the second frame 321 are moved relative to each other so as to form a space between the die 1 and the molding target 2, thereby forming the second pressure adjusting room 40. Next, the second pressure adjusting room 40 is depressurized by the depressurizer to eliminate gas present between the die 1 and the molding target 2. At this time, the first pressure adjusting room 30 is set to be the same pressure using the pressure adjuster 45, thereby preventing the die 1 held between the first frame 331 and the second frame 321 from being deflected.

In the disposing process, the pressure receiving stage 322 and the second frame 321 are moved relative to each other, and as illustrated in FIG. 2, the die 1 and the molding target 2 are disposed on the pressure receiving stage 322 in a superimposed manner.

Figure 4:
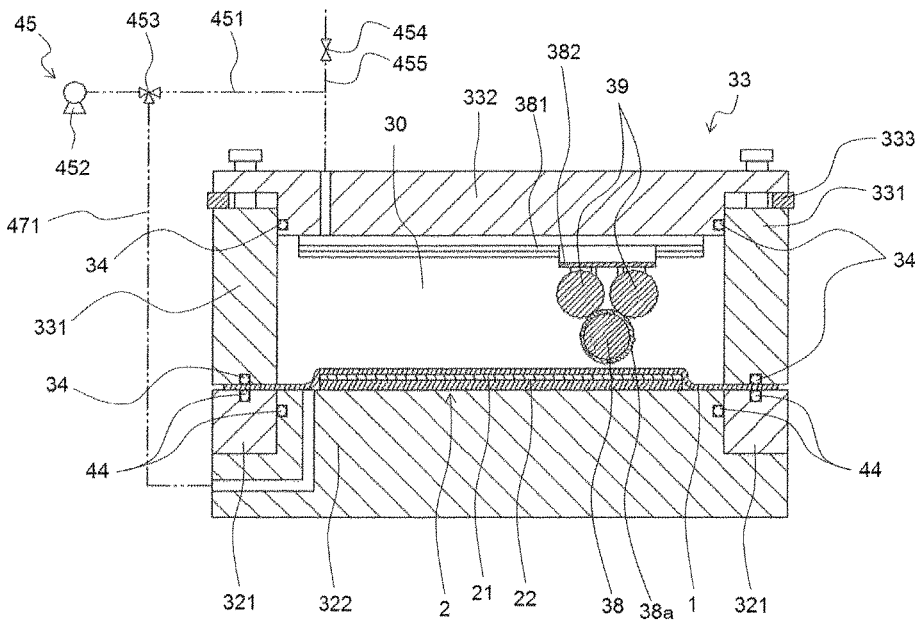
FIG. 4 is an end-face diagram illustrating the imprint device of the present disclosure.

In the intimate contact process, as illustrated in FIG. 4, the ON-OFF channel 455 is opened through the ON-OFF valve 454 to return the first pressure adjusting room 30 to the atmosphere pressure. Hence, pressure is applied to the die 1 and the molding target 2, thereby causing both to intimately contact with each other. When a pressurizer is provided, the die 1 and the molding target 2 may be caused to intimately contact with each other by increasing the pressure beyond the atmosphere pressure.

In the pressure adjusting process, as illustrated in FIG. 5, first, the spacer is taken out so as to position the main roller 38 at a location where the roller can depress the die 1 and the molding target 2. Next, the first pressure adjusting room 30 is depressurized by the depressurizer. In this case, the pressure adjusting plate 332 is pushed toward the pressure receiving stage 322 by atmospheric pressure, and force produced by a pressure difference is applied to the main roller 38. Hence, the die 1 and the molding target 2 can be depressed by the main roller 38 at a constant force.

In the depressing process, the main roller 38 is moved by the roller moving unit, and the die 1 and the molding target 2 are depressed at a constant pressure across the whole face. At this time, the pressure adjusting plate 332 pressurizes the main roller 38 through the pressure equalizer (e.g., backup rollers 39) which is disposed between the main roller 38 and the pressure adjusting plate 332, and which distributes loads applied between the main roller 38 and the pressure adjusting plate 332. Note that when the pressurizer is provided, after the depressing process by the roller 38, a fluid depressing process of depressing the die 1 and the molding target 2 with a fluid may be further provided. Hence, the mold pattern can be further surely transferred.

When an optical imprinting is performed, light with a predetermined wavelength is emitted to the molding target layer 21 from the light source provided at the back side in the moving direction of the min roller 38 while the main roller 38 is moving along the guide rails 381 to cure the molding target layer 21, thereby transferring the mold pattern to the molding target layer 21. When a thermal imprinting is performed, the molding target layer 21 is heated to a temperature equal to or higher than the glass transition temperature, is depressed by the main roller 38, and cooled after the main roller 38 moves out. For example, the roller heated to a temperature equal to or higher than the glass transition temperature may be rolled to heat and depress the molding target layer, and then the molding target layer may be cooled as needed.

A demolding process is not limited to any particular technique as long as the die 1 can be removed from the molding target 2, but for example, the casing 33 and the pressure receiving stage 322 are moved apart from each other to form a space between the die 1 and the molding target 2, and a fluid is sprayed to this space from the fluid spray provided in the second frame 321. Hence, the die 1 and the molding target 2 can be quickly removed from each other.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

REFERENCE SIGNS LIST

1 Die
2 Molding target
30 First pressure adjusting room
33 Casing
34 First pressure adjusting room sealer
38 Main roller
39 Backup roller (pressure equalizer)
40 Second pressure adjusting room
45 Pressure adjuster
46 Second moving unit
321 Second frame
322 Pressure receiving stage
331 First frame
332 Pressure adjusting plate
333 Position adjuster
455 ON-OFF channel
471 Communication channel

The invention claimed is:

1. A roller-type depressing device to depress an object with a main roller in a first pressure adjusting room, the device comprising:
a main roller;
a pressure adjusting plate that supports the main roller;
a roller moving unit that moves the main roller relative to the object in the first pressure adjusting room, wherein the roller moving unit is provided on the pressure adjusting plate;
a pressure receiving stage receiving pressure of the main roller via the object;
a pressure adjusting unit that holds the pressure adjusting plate in such a way that force produced by a pressure difference in fluid applied to both faces of the pressure adjusting plate acts on the main roller, wherein the pressure adjusting unit comprises a first pressure adjusting room component, wherein the first pressure adjusting room defined by the first pressure adjusting room component, a first of the both faces of the pressure adjusting plate, and either the object or the pressure receiving stage, and wherein a second of the both faces of the pressure adjusting plate is exterior to each of the pressure adjusting unit and the first pressure adjusting room;
a depressurizer that adjusts the pressure difference in fluid applied to both faces of the pressure adjusting plate, wherein the depressurizer depressurizes the first pressure adjusting room; and
a pressure equalizer that equalizes, along a direction of a rotation axis of the main roller, pressure applied to the object by the main roller, wherein the pressure equalizer comprises one or more backup rollers.

2. The roller-type depressing device according to claim 1, wherein the pressure equalizer further comprises a plurality of the backup rollers, the plurality of backup rollers being disposed back and forth in a direction corresponding to a direction of movement imparted on the main roller by the roller moving unit.

3. The roller-type depressing device according to claim 1, wherein the depressurizer comprises an ON-OFF channel that is capable of supplying a gas to the first pressure adjusting room until the fluid pressure applied to both faces of the pressure adjusting plate becomes equal.

4. The roller-type depressing device according to claim 1, wherein the first pressure-adjusting-room component comprises a cylindrical first frame.

5. The roller-type depressing device according to claim 4, further comprising a second frame which is formed with a hole that encircles the pressure receiving stage, and which is movable relative to the pressure receiving stage to hold the object together with the first frame,
wherein the depressurizer is capable of adjusting pressure of a second pressure adjusting room that is formed by the object, the pressure receiving stage, and the second frame.

6. The roller-type depressing device according to claim 4, further comprising a position adjuster that adjusts a relative position of the main roller to the first frame in a height direction.

7. The roller-type depressing device according to claim 1, further comprising a light source which is disposed at a back side in a moving direction of the main roller, and which emits light to the object along with a movement of the main roller.

8. The roller-type depressing device according to claim 1, further comprising a temperature adjuster that adjusts a temperature of the object.

9. The roller-type depressing device according to claim 1, wherein the pressure adjusting plate is movable relative to the first pressure adjusting room component.

10. An imprint device comprising the roller-type depressing device according to claim 1.

* * * * *